United States Patent
Surendran et al.

(10) Patent No.: US 12,321,674 B2
(45) Date of Patent: Jun. 3, 2025

(54) HIERARCHICAL CDC AND RDC VERIFICATION

(71) Applicant: TEXAS INSTRUMENTS INCORPORATED, Dallas, TX (US)

(72) Inventors: Sudhakar Surendran, Bangalore (IN); Venkatraman Ramakrishnan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 644 days.

(21) Appl. No.: 17/589,317

(22) Filed: Jan. 31, 2022

(65) Prior Publication Data

US 2023/0244841 A1 Aug. 3, 2023

(51) Int. Cl.
*G06F 30/3312* (2020.01)
*G06F 115/08* (2020.01)
*G06F 119/12* (2020.01)

(52) U.S. Cl.
CPC ...... *G06F 30/3312* (2020.01); *G06F 2115/08* (2020.01); *G06F 2119/12* (2020.01)

(58) Field of Classification Search
USPC .......................................... 716/108
See application file for complete search history.

(56) References Cited

U.S. PATENT DOCUMENTS

| | | | |
|---|---|---|---|
| 10,204,201 B1* | 2/2019 | Loh .................. | G06F 30/33 |
| 2010/0242003 A1* | 9/2010 | Kwok .................. | G06F 30/30 |
| | | | 716/106 |
| 2013/0239080 A1* | 9/2013 | Sarwary ................ | G06F 30/33 |
| | | | 716/113 |
| 2020/0401749 A1* | 12/2020 | Malani ................ | G06F 30/3308 |
| 2023/0244841 A1* | 8/2023 | Surendran ............ | G06F 30/396 |
| | | | 716/108 |

* cited by examiner

*Primary Examiner* — Mohammed Alam
(74) *Attorney, Agent, or Firm* — Xianghui Huang; Frank D. Cimino

(57) ABSTRACT

A method includes obtaining, by a computer processor according to computer instructions, data models of intellectual property (IP) cores for hierarchical clock domain crossing (CDC) and reset domain crossing (RDC) verification, where the IP cores include reusable units of logic for a system on a chip (SoC), and performing, by the computer processor based on the data models of the IP cores, the hierarchical CDC and RDC verification for the SoC according to integration of the IP cores in the SoC, where the hierarchical CDC and RDC verification includes consistency verification of functional assumptions with structural analysis of the IP cores individually and in a context of use in the SoC.

20 Claims, 4 Drawing Sheets

HIERARCHICAL CDC AND RDC VERIFICATION

BACKGROUND

In digital electronic circuits, circuit elements such as flops, latches or clock gates which are clocked by a clock signal from a single oscillator, also referred to herein as a clock, form a clock domain. Clock domain crossing (CDC) refers to the crossing of a signal, such as a data or control signal, across a boundary in a digital circuit from a first clock domain to a second clock domain.

SUMMARY

In accordance with another example of the description, a method includes obtaining, by a computer processor according to computer instructions, data models of intellectual property (IP) cores for hierarchical CDC and reset domain crossing (RDC) verification, where the IP cores include reusable units of logic for a system on a chip (SoC), and performing, by the computer processor based on the data models of the IP cores, the hierarchical CDC and RDC verification for the SoC according to integration of the IP cores in the SoC, where the hierarchical CDC and RDC verification includes consistency verification of functional assumptions with structural analysis of the IP cores individually and in a context of use in the SoC.

In accordance with at least one example of the description, an apparatus includes a memory configured to store instructions and a processor coupled to the memory, where the instructions cause the processor to be configured to obtain data models for IP cores including reusable units of logic for a SoC and the data models include interconnectivity and internal signaling within the IP cores and functional assumptions of the IP cores individually, perform, based on the data models, CDC and RDC verification of the functional assumptions of the IP cores in a context of use in the SoC, and perform CDC and RDC verification with structural analysis of the IP cores based on SoC integration of the IP cores including the interconnectivity and internal signaling of the IP cores.

In accordance with at least one example of the description, an apparatus includes a memory configured to store instructions and a processor coupled to the memory, where the instructions cause the processor to be configured to obtain data models of IP cores including reusable units of logic for a SoC, obtain, according to the data models, a hierarchical analysis model including interconnectivity and internal signaling within the IP cores and functional assumptions of the IP cores individually and in a context of use in the SoC, and perform, based on the hierarchical analysis model, hierarchical CDC and RDC verification for the SoC according to integration of the IP cores in the SoC including consistency verification of functional assumptions and structural analysis of the IP cores individually and in the context of use in the SoC.

DETAILED DESCRIPTION

Figure 1:
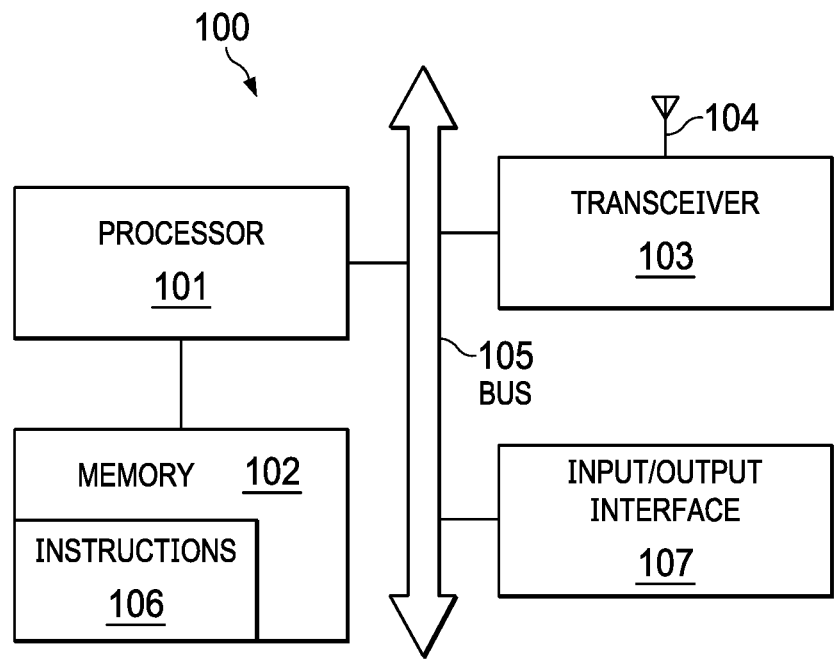
FIG. 1 is a block diagram of a processing system, in accordance with various examples.

A signal that crosses from a first clock domain to a second clock domain may be adjusted because the two clock domains can be asynchronous with respect to each other. RDC is another related boundary issue that refers to resetting the circuit elements in the two clock domains asynchronously with respect to each other by two respective reset signals that are independent from each other.

As digital electronic circuit designs continue growing in complexity, the number of clock domains in modern SoCs can reach dozens or hundreds of clock domains. The number of clock domains introduces challenges to CDC and RDC design. CDC and RDC challenges include the issue of metastability, such as a signal from a clock generator of a source domain changing value too close to a clock signal edge of a destination domain, or clock and data signals changing values too closely in time. In such cases, a circuit element such as a flip-flop in the destination domain may enter a metastable state that causes the output of the flip-flop to take some time to settle to a high or low value. The result of this behavior can cause incorrect output in SoCs. A digital circuit architecture can be designed to account for both CDC and RDC issues to mitigate errors in processing signals, including data, control, and reset signals, between multiple clock domains.

A SoC can include multiple reusable units of logic, which are the IP of one or multiple parties. A unit of logic, also referred to herein as an IP core, may include multiple circuit elements including a clock generator that generates a clock signal. For example, designers of application-specific integrated circuits (ASICs) and systems of field-programmable gate array (FPGA) logic include IP cores as building blocks in SoCs.

CDC and RDC related issues in SoCs can be analyzed, as part of the SoC design, to verify design assumptions related to CDC and RDC timing and signal stability. Performing CDC and RDC verification by running and checking output for SoCs can be tedious and error prone. Accordingly, tools may be developed to perform CDC and RDC verification, which can be provided via software, hardware, or combinations thereof. Examples of CDC and RDC verification tools include computer programs or instructions for CDC and RDC verification based on data that represents SoC design. The verification focuses on assumptions at a SoC level of connectivity and signaling of IP cores collectively and the passing of signals between the IP cores. However, the CDC and RDC verification at the SoC level in current CDC and RDC verification tools does not include assumptions at the individual IP cores in use within a SoC, also referred to herein as the IP level, such as assumptions related to the structural analysis including interconnectivity and internal signaling within the IP cores. The CDC and RDC verification tools may also lack the verification of functional aspects of the individual IP cores at the IP level within use context in the SoC. Accordingly, assumptions at the IP level of the individual IP cores may not be cross-checked during CDC and RDC verification at the SoC level, which causes incomplete analysis data for verification and reduces SoC design efficiency to resolve CDC and RDC issues.

This description describes various examples of hierarchical CDC and RDC verification methods. The hierarchical CDC and RDC verification includes steps to provide and verify assumptions for CDC and RDC timing and signaling at the SoC and IP levels in a structured manner according to the hierarchical structure between the IP cores within a context SoC design and use. The CDC and RDC verification steps can be performed by tools developed to perform CDC and RDC verification, such as computer programs or instructions, based on data models which are provided as input. The hierarchical CDC and RDC verification also includes cross-checking the CDC and RDC timing and signaling between the IP cores according to the provided data models. The CDC and RDC verification steps capture assumptions, provided by the data models, for the SoC level including the IP level. For example, the assumptions at the IP level include IP level boundary assumptions that affect domain crossing at the SoC level. The IP level assumptions also include assumptions related to boundary connectivity for SoC level integration. The IP level assumptions also include assumptions regarding signals internal to the IP cores, and which are influenced by the integration of the IP cores in the SoC. The IP level assumptions are verified based on information captured at various levels of the SoC design, including the SoC and IP levels. The steps may be implemented, such as with metrics-driven verification models, to provide structural analysis and functional verification of CDC and RDC design in SoCs.

FIG. 1 is a block diagram of a processing system 100 useful for running computer programs or instructions to perform the steps of the hierarchical CDC and RDC verification methods, in accordance with various examples. The processing system 100 includes hardware components that may be part of a terminal device or may be on a chip or a SoC in a device. For example, the processing system 100 may be a computer terminal configured to run a software tool for CDC and RDC verification based on stored data models of a SoC design. In another example, the processing system 100 may be part of or coupled to a SoC and provides input signals to and/or obtains output signals from the SoC. The input and output signals are processed by the processing system 100 to perform CDC and RDC verification for the SoC according to data models provided to the processing system 100. As shown in FIG. 1, the processing system 100 may include one or more processors 101 and one or more memories 102. In some examples, the processing system 100 may also include one or more transceivers 103 for establishing connections. These components may be connected through a bus 105 or in any other suitable manner. In FIG. 1, an example in which the components are connected through a bus 105 is shown.

The processor 101 is configured to read and execute computer-readable instructions. For example, the processor 101 is configured to invoke and execute instructions in a program stored in the memory 102, including instructions 106. Responsive to the processor 101 sending data, the processor 101 drives or controls the transceiver 103 to perform the sending. The processor 101 also drives or controls the transceiver 103 to perform receiving, responsive to the processor 101 receiving data. Therefore, the processor 101 may be considered as a control center for performing sending or receiving data and the transceiver 103 is an executor for performing the sending and receiving operations.

In some examples, the memory 102 is coupled to the processor 101 through the bus 105 or an input/output port 104. In other examples, the memory 102 is integrated with the processor 101. The memory 102 is configured to store various software programs and/or multiple groups of instructions, including the instructions 106. The memory 102 may include one or more storage devices. For example, the memory 102 includes a high-speed random-access memory and/or may include a nonvolatile memory such as one or more disk storage devices, a flash memory or another nonvolatile solid-state storage device. The memory 102 may store an operating system such as ANDROID, IOS, WINDOWS or LINUX. The memory 102 may further store a network communications program. The network communications program is useful for performing communications with one or more attached devices, one or more user equipments or one or more network devices. The memory 102 may further store a user interface program. The user interface program displays content of an application through a graphical interface and receive data or an operation performed by a user on the application via an input control such as a menu, a dialog box or a physical input device (not shown). The memory 102 is configured to store the instructions 106 for implementing the various methods and processes provided in accordance with the various examples of this description.

The transceiver 103 includes a transmitter and a receiver. The transceiver 103 is configured to transmit a signal that is provided by the processor 101. The transceiver 103 is also configured to receive a signal from other devices or equipments. The processing system 100 may also be provided with a wired network interface or a local area network (LAN) interface to support wired communication. The processing system 100 may also include communications components to send and receive wireless communications signals.

The processing system 100 may further include an input/output interface 107 for enabling communications between the processing system 100 and one or more input/output devices (not shown). Examples of the input/output devices include an audio input/output device, a key input device, a display and the like. The input/output devices are configured to implement interaction between the processing system 100 and a user or an external environment. The input/output device communicates with the processor 101 through a user interface.

Figure 2:
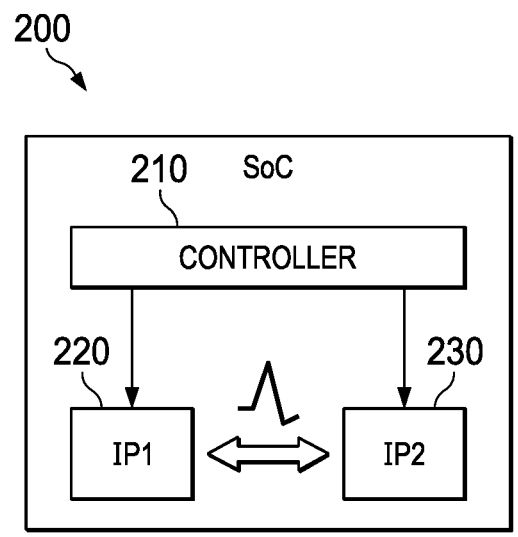
FIG. 2 is a block diagram of a SoC design, in accordance with various examples.

FIG. 2 is a block diagram of a SoC 200, in accordance with various examples. The SoC 200 includes IP cores connected in a hierarchical structure in the SoC 200. The IP cores include a controller 210 that is electrically coupled to a first IP core 220 and a second IP core 230. The controller 210 sends control signals to the first IP core 220 and the second IP core 230. The first IP core 220 and the second IP core 230 can also send signals among each other at the second level. The controller 210 represents a first level of the hierarchical structure. The first IP core 220 and second IP core 230 represent a second level of the hierarchical structure. The hierarchical structure may also include more levels or IP cores (not explicitly shown in FIG. 2), where an IP core at a certain level is coupled and sends signals, such as data signals, to one or more IP cores at another level. The IP cores at the same level can also send signals among each other.

In examples for CDC and RDC verification, operation information of the IP cores in the SoC 200 are represented by data models, which include abstractions of signaling and timing information of the IP cores. The data models of the IP cores can be stored and processed by a processing system, such as the processing system 100. The data models of the IP cores may be represented by data files which include values and parameters that can be processed by computer code or other forms of computer instructions. Examples of data files for providing abstractions of operational aspects of the IP cores include liberty timing library (LIB) files, also referred to herein as .lib files. The LIB files provide timing information based on timing models for the signals in the individual IP cores. The timing models in the LIB files are useful for CDC and RDC verification and provide timing information of the signals within the respective IP cores individually.

Other operational aspects of the IP cores in the SoC 200, such as at a collective level and based on a hierarchical structure of the IP cores, that are also useful for CDC and RDC verification may not be included in the timing models provided by the LIB files. For example, the timing models of the LIB files may not include aspects of reset implications, combinational logic, or synchronization between the IP cores. Excluding such information from the CDC and RDC verification process can reduce the accuracy of predicting output signals and signal timing in the SoC 200. For example, the CDC and RDC verification may provide incomplete and accordingly inaccurate RDC analysis without including data models which provide reset signal aspects at the collective level and based on the hierarchical structure of IP cores. Accordingly, such aspects are also included in the data models for CDC and RDC verification. For example, the data models provide abstractions of internal and external synchronization statuses of data and reset signals, such as for the IP cores collectively according to the hierarchical structure in the SoC 200. The data models also include abstractions of external and virtual reset signals in the IP cores, reset resources both internal to and at the output of IP cores, clock signals and clock signals relationships internal to and among the IP cores including clock signals outside the IP cores in the SoC 200. The data models also include information on the ordering of reset signals internal to and among the IP cores, information on glitch sources and sensitivity on the boundaries among the IP cores, convergence scenarios such as for clock signals, reset signals and data signals, and other functional assumptions of operational aspects of the IP cores.

Figure 3:
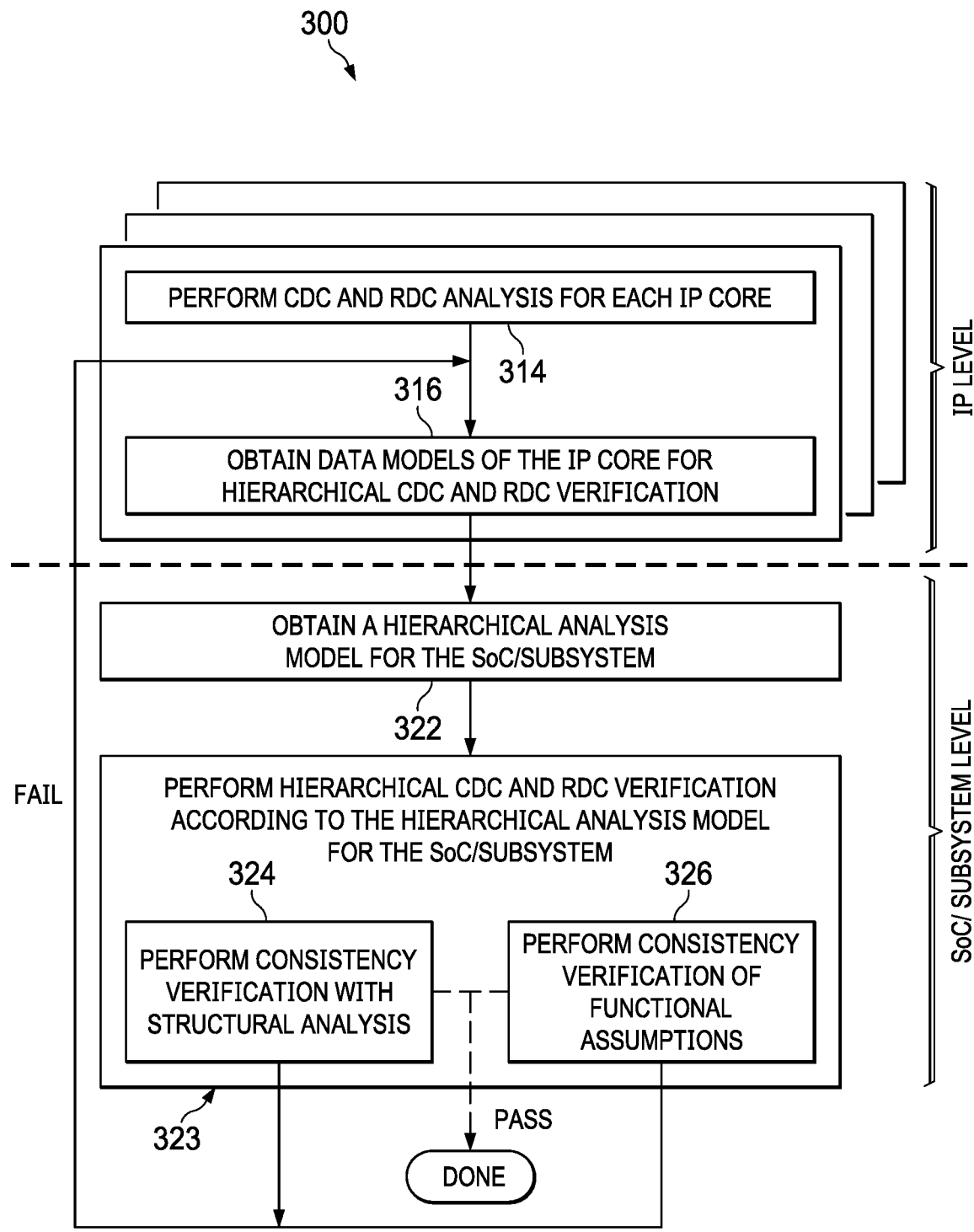
FIG. 3 is a flow diagram of a method for hierarchical CDC and RDC verification, in accordance with various examples.

FIG. 3 shows a flow diagram of a method 300 for hierarchical CDC and RDC verification, in accordance with various examples. The method 300 provides steps for verifying assumptions for operational aspects of IP cores at both the individual IP level and at the SoC or subsystem level, which is a collective IP level. The steps of the method 300 are performed with data models provided based on the hierarchical structure of IP cores in the SoC. The steps can be performed by a tool configured for CDC and RDC verification, such as software, hardware or both. For example, the CDC and RDC verification tool is a computer program that processes uploaded or stored data models of the IP cores and SoC, such as in metrics-driven verification models. The method 300 may be performed by a processing system, such as a processing system 100.

At the individual IP level, the method 300 includes steps 314 and 316 which are performed for each IP core. At step 314, CDC and RDC analysis is performed for each IP core undergoing verification. At step 316, data models of the IP core for hierarchical CDC and RDC verification are obtained. The data models may be obtained according to the CDC and RDC analysis of the IP core. The data models for hierarchical CDC and RDC verification include IP models of the individual IP cores. The IP models provide abstractions of data and reset signals, timing information, combinational logic, synchronizations status, clock signals, boundary information, and functional assumptions for operations of the IP cores. The IP models may be provided as input to the CDC and RDC verification tool. The data models for the hierarchical CDC and RDC verification are also obtained according to SoC or subsystem integration of the IP cores.

At the SoC or subsystem level, the method 300 includes steps 322, 323, 324, and 326. At step 322, a hierarchical analysis model for the SoC or subsystem is obtained according to the data models. The hierarchical analysis model allows CDC and RDC verification at the SoC or subsystem level according to SoC or subsystem integration of the IP cores. The hierarchical analysis model at the SoC or subsystem level includes assumptions at the individual IP cores in use within the SoC, such as assumptions related to the structural analysis including interconnectivity and internal signaling within the IP cores and functional aspects of the individual IP cores at the IP level within use context in the SoC.

At step 323, hierarchical CDC and RDC verification is performed based on the data models of the IP cores according to the SoC or subsystem integration of the IP cores, which is provided by the hierarchical analysis model. The hierarchical CDC and RDC verification includes CDC and RDC verification for the IP cores in a context of use in the SoC based on structural analysis and functional assumptions of the IP cores. The hierarchical CDC and RDC verification includes step 324 for the structural analysis and step 326 for the functional assumptions. Steps 324 and 326 may be at least partially performed concurrently or consecutively with respect to each other. At step 324, consistency verification with structural analysis is performed. The consistency verification is based on IP level information useful for verifying assumptions for operational aspects according to the hierarchical structure of IP cores. The IP level information is useful for performing structural analysis comprehensively at the SoC or subsystem level. The IP level information captures information on clock and reset sources internal to the IP cores, and the relationships of the reset sources internal to boundary signals in the IP cores. In examples, the consistency verification at the IP level includes checks of consistency for clock signals and the clock signals relationships, reset signals and reset signals relationships, and clock and reset signals associations. The consistency verification also includes checks of correlations for ports synchronicity at the SoC or subsystem level with synchronicity assumptions at the IP level, and for virtual clock signals and virtual reset signals and associated ports relations. The IP level information for performing verification with structural analysis include properties of ports and related constraints, such as clock signals and reset signals associations, clock signals relations, reset signals orders, internal clocks and reset sources, glue logic presence on ports, convergence logic and depth of convergence logic on ports, and synchronization and hand-shake port properties.

At step 326, consistency verification of functional assumptions is performed. The verification is based on IP level information useful for performing functional verification at a collective IP level. The IP level information includes IP level boundary assumptions that influence domain crossings between the IP cores at the SoC or subsystem level, and IP level assumptions, such as for boundary connectivity, based on SoC or subsystem integration. The functional assumptions include assumptions on signal functional properties and relations of the signals with other signals. The signal functional properties include properties associated with integration of ports at the SoC or subsystem level, properties internal to the IP cores and having triggers at the SoC or subsystem level, and properties completely internal to the IP cores. The functional assumptions also include functional assumptions on ports, functional coverage items for assumptions internal to IP cores that are influenced by the SoC or subsystem, and internal functional assumptions at the IP level. Port assumptions include assumptions of signal constants, pseudo-static signals, mutual-exclusivity of signals, and other assumptions expressed as relations between signals. Functional coverage items for assumptions internal to IP cores that are influenced by the SoC or subsystem include internal assumptions which have dependency on ports sequences. For example, a precondition for such internal assumptions is to include an IP port. Internal functional assumptions at the IP level include functional assumptions that do not have dependency on ports or port signals.

If either of the verification processes in step 324 and step 326 fails, steps 316 and 322 are repeated to update the data models and the hierarchical analysis model before again attempting the verification processes in steps 323, 324 and 326. Accordingly, the data models are updated by modifying the assumptions which did not pass the consistency verification processes with structural analysis and for functional assumptions. The steps of the method 300 may be repeated until the consistency verification processes in steps 324 and 326 are verified without failure, such as due to incorrect assumptions.

Figure 4:
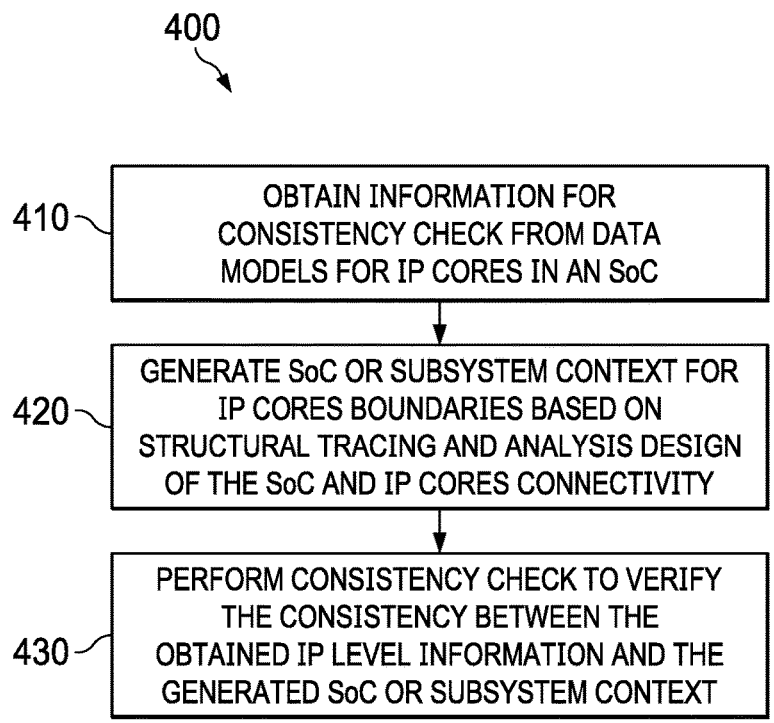
FIG. 4 is a flow diagram of a method for consistency verification with structural analysis in hierarchical CDC and RDC verification, in accordance with various examples.

FIG. 4 is a flow diagram of a method 400 for consistency verification with structural analysis in a hierarchical CDC and RDC verification process, in accordance with various examples. For example, the method 400 may be performed in step 324 of the method 300 for hierarchical CDC and RDC verification. At step 410, information for consistency check is obtained from data models for IP cores in a SoC. For example, the information, which is IP level information useful for performing structural analysis at a collective IP level, includes information of ports and constraints, and information of clock and reset signals relations, associations, synchronization and convergence at the IP cores. At step 420, SoC or subsystem context for IP cores boundaries is generated based on structural tracing and analysis design of the SoC and IP cores connectivity. At step 430, a consistency check is performed to verify the consistency between the obtained IP level information and the generated SoC or subsystem context.

Figure 5:
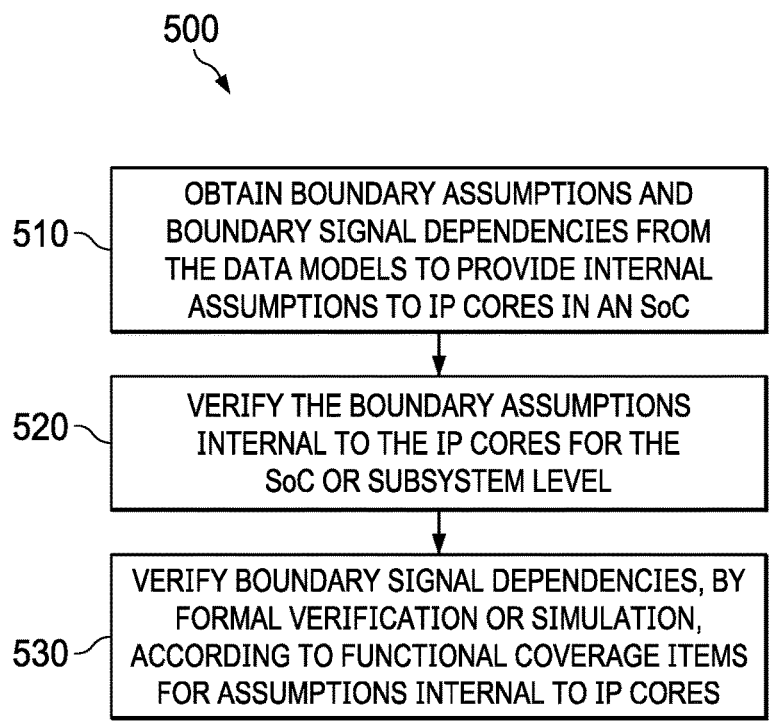
FIG. 5 is a flow diagram of a method for consistency verification of functional assumptions in hierarchical CDC and RDC verification, in accordance with various example.

FIG. 5 is a flow diagram of a method 500 for consistency verification of functional assumptions in a hierarchical CDC and RDC verification process, in accordance with various examples. For example, the method 500 may be performed in step 326 of the method 300 for hierarchical CDC and RDC verification. At step 510, boundary assumptions and boundary signal dependencies are obtained from the data models to provide internal assumptions to IP cores in a SoC. At step 520, the boundary assumptions internal to the IP cores are verified for the SoC or subsystem level. The verification can be performed either by formal verification on a SoC or by simulation. For example, formal verification may be performed by removing selective block-boxing of IP cores based on assumptions dependencies. A formal model useful for formal verification may be used for verifying internal functional assumptions of IP cores, such as instead of using more complete IP information. At step 530, boundary signal dependencies are verified, by formal verification or simulation, according to functional coverage items for assumptions internal to IP cores.

Figure 6:
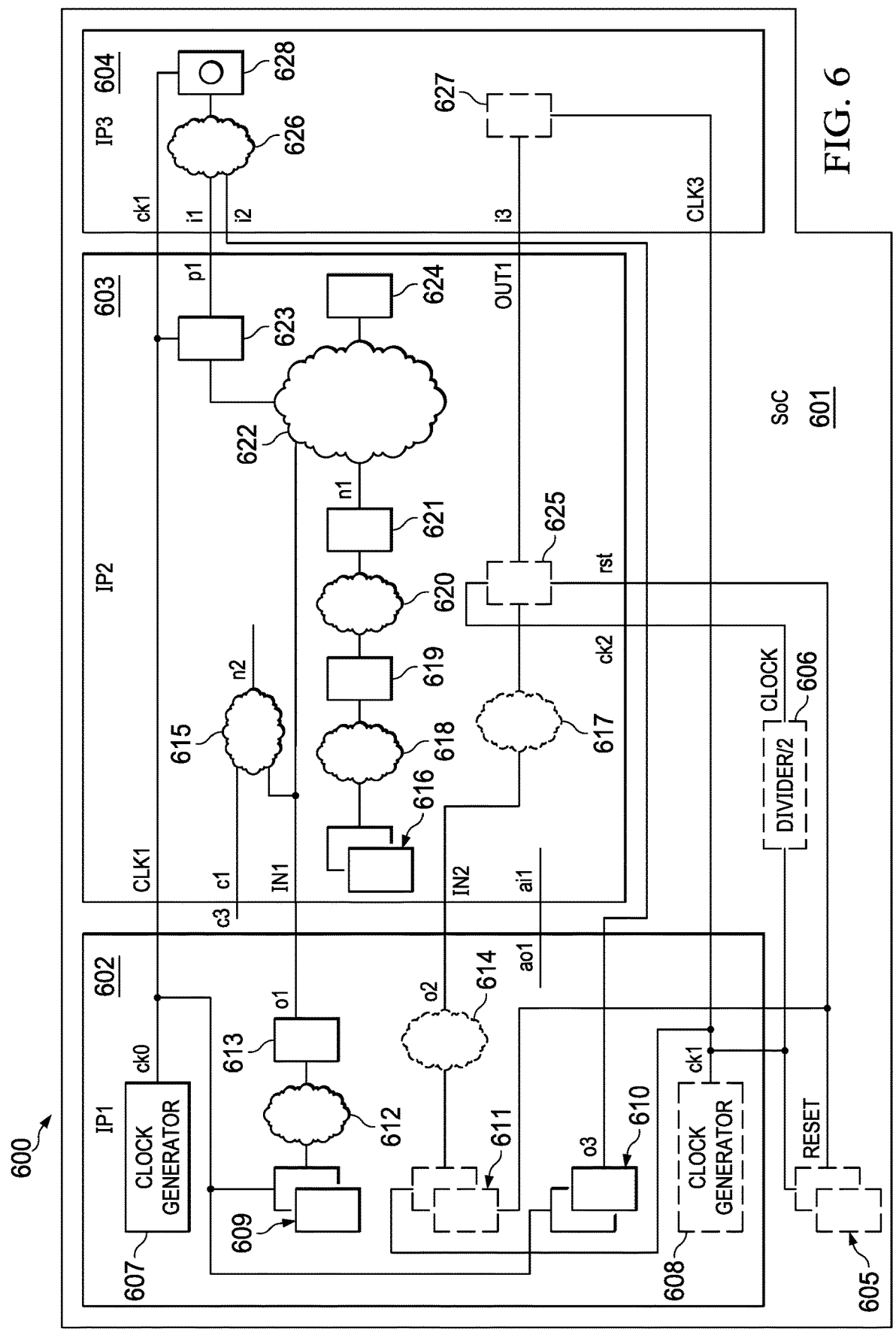
FIG. 6 is a block diagram of a SoC design, in accordance with various examples.

FIG. 6 is a block diagram of a SoC design 600, in accordance with various examples. The SoC design 600 is for IP cores connected in a hierarchical structure in a SoC 601. The SoC 601 includes a first IP core (IP1) 602, a second IP core (IP2) 603 coupled to the first IP core 602, and a third IP core (IP3) 604 coupled to the second IP core 603. The SoC 601 also includes a first synchronizer 605 and a divide-by-two counter 606, also referred to herein as a divider by two, both coupled to the first IP core 602 and the second IP core 603. The first synchronizer 605 provides a reset signal (RESET) at an output of the first synchronizer 605, and the divide-by-two counter 606 provides a first clock signal (CLOCK) at an output of the divide-by-two counter 606.

The first IP core 602 includes a first clock generator 607 and a second clock generator 608. The first clock generator 607 provides a second clock signal (ck0) at an output of the first clock generator 607, and the second clock generator 608 provides a third clock signal (ck1) at an output of the second clock generator 608. Both the first synchronizer 605 and the divide-by-two counter 606 are coupled to the output of the second clock generator 608. The first IP core 602 also includes a second synchronizer 609 and a third synchronizer 610 both coupled to the output of the first clock generator 607, and a fourth synchronizer 611 coupled to the output of the first synchronizer 605 and the output of the second clock generator 608. The first IP core 602 also includes a first cluster 612 coupled to an output of the second synchronizer 609 and a first flip-flop 613 coupled to an output of the first cluster 612, and a second cluster 614 coupled to an output of the fourth synchronizer 611. The first IP core 602 includes a first port (o1) coupled to an output of the first flip-flop 613, a second port (o2) coupled to an output of the second cluster 614, a third port (o3) coupled to an output of the third synchronizer 610, and a fourth port (ao1).

The second IP core 603 includes a fifth port (CLK1), a third cluster 615 coupled to a sixth port (c1) and a seventh port (IN1) of the second IP core 603, a fifth synchronizer 616, a fourth cluster 617 coupled to an eighth port (IN2) of the second IP core 603, and a ninth port (ai1). The fifth port (CLK1) is coupled to the output of the first clock generator 607 of the first IP core 602. The sixth port (c1) is coupled to an external connection (c3). The seventh port (IN1) is coupled to the second port (o2) of the first IP core 602. The eighth port (IN2) is coupled to the first port (o1) of the first IP core 602. The ninth port (ai1) is coupled to the fourth port (ao1) of the first IP core 602. The second IP core 603 also includes a fifth cluster 618 coupled to an output of the fifth synchronizer 616, a second flip-flop 619 coupled to an output of the fifth cluster 618, a sixth cluster 620 coupled to an output of the second flip-flop 619, a third flip-flop 621 coupled to an output of the sixth cluster 620, a seventh cluster 622 coupled to an output of the third flip-flop 621 and the seventh port (IN1). The third flip-flop 621 provides a first internal signal (n1) to the seventh cluster 622. The third cluster 615 provides a second internal signal (n2). The second IP core 603 also includes a fourth flip-flop 623 coupled to an output of the seventh cluster 622 and the fifth port (CLK1), and a fifth flip-flop 624 coupled to an output the seventh cluster 622. The second IP core 603 includes a sixth flip-flop 625 coupled to an output of the fourth cluster 617, the output of the divide-by-two counter 606 and the output of the first synchronizer 605 through a tenth port (rst) of the second IP core 603. The second IP core 603 also includes an eleventh port (p1) coupled to an output of the fourth flip-flop 623, and a twelfth port (OUT1) coupled to an output of the sixth flip-flop 625.

The third IP core 604 includes a thirteenth port (ck1) coupled to the fifth port (CLK1) of the second IP core 603, a fourteenth port (i1) coupled to the eleventh port (p1) of the second IP core 603, a fifteenth port (i2) coupled to the third port (o3) of the first IP core 602, a sixteenth port (i3) coupled to the twelfth port (OUT1) of the second IP core 603, and a seventeenth port (CLK3) coupled to the output of the second clock generator 608 of the first IP core 602. The third IP core 604 also includes an eighth cluster 626 coupled to the fourteenth port (i1) and the fifteenth port (i2), a seventh flip-flop 627 coupled to the sixteenth port (i3), and a converging flip-flop 628 coupled to an output of the eighth cluster 626 and the thirteenth port (ck1).

The SoC 601 includes multiple clock domains according to the connectivity of the first, second and third IP cores 602, 603 and 604, the first clock generator 607, and the second clock generator 608. The clock domains include a first clock domain associated with the second clock signal (ck0) of the first clock generator 607, the fifth port (CLK1) of the second IP core 603, and the thirteenth port (ck1) of the third IP core 604. The first clock domain also includes the second and third synchronizers 609 and 610, the first cluster 612, and the first flip-flop 613 in the first IP core 602. In the second IP core 603, the first clock domain includes the third, fifth, sixth and seventh clusters 615, 618, 620 and 622, the fifth synchronizer 616, and the second, third, fourth and fifth flip-flops 619, 621, 623 and 624. The second clock domain includes the eighth cluster 626 and the converging flip-flop 628 in the third IP core 604. The clock domains in the SoC 601 also include a second clock domain associated with the second clock generator 608, the divide-by-two counter 606 and the first synchronizer 605. The second clock domain also includes the fourth synchronizer 611 and the second cluster 614 in the first IP core 602, the fourth cluster 617 and the sixth flip-flop 625 in the second IP core 603, and the seventh flip-flop 627 in the third IP core 604.

As part of a CDC and RDC verification process for the SoC design 600, consistency verification with structural analysis may be performed according to data models for the first, second and third IP cores 602, 603 and 604, the first synchronizer 605 and the divide-by-two counter 606 in the SoC 601. Consistency verification with structural analysis may include clock signal consistency check, reset signal consistency check, synchronization consistency check, and glitch check.

The data captured for clock signal consistency check includes properties of clock signals, such as port clock signals, internally generated clock signals in the IP cores and clock signals not present in the SoC design 600. Examples of properties of clock signals include clock signal sources such as including clock signals generated internally inside IP cores, relations between the clock signals, clock signals waveforms, and clock signals ratios. The data for clock signal consistency check also includes relations of clock signals with ports and other clock signals properties useful structural analysis of clock signal consistency. The data can be formatted in any suitable form for storing and processing. For example, the data can be text data obtained based on IP level constraints for CDC and RDC analysis at the IP level. In examples, the text data for clock signal consistency check includes: clocks={{CLK1}, {CLK3, virtual}; {ck2}}, clock_relation={{ck2=CLK3/2, synchronous}}; port_details: {{IN1, CLK1}, {IN2, CLK3}, {OUT2, ck2}}.

The clock signal consistency check includes checks for consistency of clock signals properties and relationships as inferred at the SoC context, and SoC or subsystem ports synchronicity versus IP level synchronicity assumptions and relationships between ports and external clock signals for inputs and outputs. The clock signals consistency check may also include checking use of inferred behavior from the captured data of the hierarchical models for SoC analysis.

In an example, the check for consistency of clock signals properties and relationships includes deriving port connections of CLK1, CLK3 and ck2 of IP2 at the analysis level. For example, the derived port connections include ck0 of IP1, ck1 of IP1 and CLOCK at the SoC or subsystem (SUB-SYS) level in the SoC design 600. The virtual clock connections are derived based on clock signals propagation in the use context in a SoC. The check for consistency of clock signals properties and relationships includes deriving the relations of clock signals at the analysis level, which may be the SUB-SYS level. For example, a relation of clock signals at the analysis level is: CLOCK is divided by 2 of ck2 of IP1, which can be captured as text data by: {{CLOCK=IP1.ck2/2, synchronous}}. The check for consistency of clock signals properties and relationships also includes checking if the relations of clock signals in IP2 match the relations in SUB-SYS. For example, the IP2 clock signal relation {{ck2=CLK3/2, synchronous}} is checked at SUB-SYS by mapping ck2 to CLOCK and mapping CLK3 to ck1 of IP1. According to such mappings, the clock signal relation becomes {{CLOCK=IP1.ck2/2, synchronous}}, which is one of the clock signals relations derived at SUB-SYS.

In an example, the check for SoC or subsystem ports synchronicity versus IP level synchronicity assumptions includes deriving the port connections of IP2 at the analysis level. In the SoC design 600, the mappings for clock signals CLK1, CLK3 and ck2 of IP2 is ck0.IP1, ck1.IP1 and CLOCK at SUB-SYS level, respectively. Similarly, the mapping for ports IN1, IN2 and OUT2 is o1.IP1, o2.IP1 and i3.IP3, respectively. For IP2, clock CK3 maps to ck1.IP1 and port i1 maps to OUT2.IP2. The check for SoC or subsystem ports synchronicity versus IP level synchronicity assumptions includes deriving the relation of clock signals at the analysis level, which is the SUB-SYS level. For example, the derived relation is: CLOCK is divided by 2 of ck2 of IP1, which can be captured as text data by: {{CLOCK=IP1.ck2/2, synchronous}}. The check for SoC or subsystem ports synchronicity versus IP level synchronicity assumptions includes checking the port details of IP1, IP2 and IP3 by using the analysis level mapping and the clock signals relations. For IP2, based on the port connections, the port details become {{o1.IP1, ck0.IP1}, {o2.IP1, ck1.IP1}, {i3.IP3, ck1.IP1/2}}. The port details of IP2 match the port details of IP1 and IP3 by similar mappings.

The data captured for reset consistency check includes properties of reset signals, such as port reset signals, internally generated reset signals and reset signals not present in the SoC design 600. Examples of properties for reset consistency check include reset signal sources, relations between the reset signals, and relations of reset signals with respect to the clock signals. The data for reset consistency check also includes relations of reset signals with ports and other reset signals properties useful for structural analysis of reset signal consistency. The data can be formatted in any suitable form for storing and processing. For example, the data can be text data obtained based on IP level constraints for CDC and RDC analysis at the IP level. In examples, the text data for reset consistency check includes: resets={{rst, CLK3, synchronized}}; port_reset_details={{IN2, rst}}.

The reset signal consistency check includes checks for consistency of reset signals properties and relationships as inferred at the SoC context, and reset behavior on SoC or subsystem ports versus IP level synchronicity assumptions and relationships between ports and external reset signals for inputs and outputs. The reset signals consistency check may also include checking use of inferred behavior from the captured data of the hierarchical models for SoC analysis.

In an example, the check for consistency of reset signals properties and relationships includes deriving port connections of CLK1, CLK3 and ck2 of IP2 at the analysis level. For example, the derived port connections include ck0 of IP1, ck1 of IP1 and CLOCK at the SUB-SYS level. The virtual clock connections are derived based on clock signals propagation in the use context in the SoC. The check for consistency of reset signals properties and relationships includes deriving the port connections of rst of IP2 at the analysis level, which is RESET at the SUB-SYS level. The synchronicity of rst of IP2 at the analysis level is also derived. This is ck1.IP1 at the SUB-SYS level and associated synchronized reset, which can be captured as text data by: ("ck1.IP1, synchronized"). Similarly, the synchronicity of rst at IP2 is derived by mapping CLK3 in "CLK3, synchronized" to ck1.IP1 in ("ck1.IP1, synchronized"). The check for consistency of reset signals properties and relationships also includes checking if the synchronicity at the IP level matches the synchronicity at the analysis level. For example, if "ck1.IP1, synchronized" at the IP level matches with "ck1.IP1, synchronized" at the analysis level, then this step passes the checking process.

The data captured for glitch check includes combinational logic at the ports in the SoC design 600. The data can be formatted in any suitable form for storing and processing. For example, the data can be text data obtained based on IP level constraints for CDC and RDC analysis at the IP level. In examples, the text data for glitch check includes: at IP2 level: port_combo_details={c1, IN2}; port_details: {{IN1, CLK1}, {IN2, CLK3}, {c1, CLK1}, {p1, CLK1}, {OUT2, ck2}; at IP1 level: port_combo_details={o2}; port details: {{o2, ck1}, ... }; at IP3 level:port_combo_details={i1, i2}; port details: {{i1, ck1}, ... }.

The glitch check includes checks on ports or boundary functionality at the IP level as inferred at the SoC use context, and checking use of inferred behavior from the captured data of the hierarchical models for SoC analysis. In an example, the glitch check includes deriving combinational logic from IP level data and the analysis level. For example, the combinational logic for IP2 is present on input ports c1 and IN2. Accordingly, the connections at the analysis level for the ports c1 and IN2 is derived as "c3" and "o2.IP1", respectively. The glitch check includes deriving the synchronicity of the ports c1 and IN2 of IP2, which is CLK1 and maps to ck0.IP1. The glitch check also includes checking if any asynchronous input is connected to IP2 input ports c1 and IN2. If there are no such connections, then this step passes the checking process.

The data captured for convergence check includes logic depth of ports that converge based on synchronization properties of the ports, minimum depth of flip-flops from inputs to outputs of ports, minimum depth of outputs from synchronizers, minimum depth of inputs to synchronizers, minimum depth for each input combination at a flip-flop, and minimum depth for each input combination at an output. In examples, the text data for convergence check includes: IP3: port_in_flop_depth={{{i1, 0}, {i2, 0}}}; port) sync_details={{i2, CLK3, DFF}}; IP1: port_out_sync_depth={{o1, 3}, {o2, 2}, {o3, 2}}; port_out_flop_depth={{o1 {SYNC, 3}}, . . . }; IP2: port_out_flop_depth={{p1 {i1, 1}, {SYNC, 5}}}.

The convergence check includes checking, at the analysis level, if the synchronizers are converging, and checking if the depth of convergence is less than user configuration. In an example, the convergence check includes checking if ports i1 and i2 in IP3 are converging at a depth of 0, and checking if i1.IP3 and i2.IP3 connections are to p1.IP2 and o3.IP1. The convergence check may also include checking if i1.IP3 which is connected to p1.IP2 has a depth of 5 from the synchronizer and a depth of 1 from input i1.IP2, checking if input of i1.IP2 is connected to o1.IP1 which has a depth of 3 from the synchronizer, and checking if the minimum depth from the synchronizer for p1.IP2 (i1.IP3) is 4, including a depth of 3 from o1.IP1 and a depth of 1 from i1.IP2. The convergence check may also include checking if i2.IP2 which is connected to o3.IP1 has a depth of 2 from the synchronizer. For example, if, at IP3 level, i1 and i2 are converging with actual depths of 4 and 2 from the synchronizer, then the convergence check fails.

Functional verification may also be performed as part of the CDC and RDC verification process for the SoC design 600. Functional verification includes verifying port consistency based on properties directly influenced by ports integration at the SoC or subsystem level. Functional verification also includes verifying internal signal consistency based on properties internal to the IP cores and influenced by the SoC or subsystem level, and assumptions for actual runtime of a CDC and RDC verification program, also referred to herein as formal runs, based on properties internal to the IP cores.

The data captured for verifying port consistency includes properties of ports, such as constants for ports. The data may also include functional relations between ports including sequence relations, such as a conditionally constant one-hot when combined with other ports. The data can be formatted in any suitable form for storing and processing. For example, the data can be text data obtained based on IP level constraints for CDC and RDC analysis at the IP level. For example, the data can be captured in SystemVerilog or another assertion language. In examples, the text data for port consistency verification includes: at IP2 level: constant={{c1, 2'h3}}; functional={{input_assumptions: assume property (@(posedge CLK1) disable iff(rst) $fell (ai1)|⇒$stable(IN1));}, {input_assumptions1:assume property (@(posedge CLK3) $changed(IN2)=>~$changed (IN2));}}.

The port consistency verification includes checking at the analysis level the functional properties ports and if the relations of the ports and properties hold true. In an example, the port consistency verification includes converting the constraints to an assertion language format, such as SystemVerilog format. For example, a port constant is mapped as "ip2_constantl: assume property (@(posedge CLK1) disable iff(rst) c1==2'h3)". Port consistency verification also includes removing a consequent part of a cover property, such as "input_influence: cover property (@(posedge CLK1) disable iff(rst) $changed(IN2))". The signal names are also mapped to have hierarchical paths. The virtual clock and reset signals are mapped to the actual clocks and reset signals at the analysis level. Accordingly, the name of the assertion is changed to have the instance name of the module appended to it, such as "input_influence_IP2: cover property (@(posedge ck1.IP1) disable iff(RESET) $changed (IN2.IP2))". The cover property can be verified by formal verification with a program, simulation, or other tools.

The data captured for verifying internal signal consistency includes internal signals influenced by ports, such as an internal signal property that depends on an input port signal.

For example, the text data for internal signal consistency verification includes: at IP2 level: functional_influence={{input_influence: assert property (@(posedge CLK1) disable iff(rst) $changed(IN2)|→$stable(n1));}}.

The internal signal consistency verification includes checking at the analysis level that the functional properties influenced by ports are not vacuous pass. The ports and the ports conditions are valid at the analysis level. In an example, the internal signal consistency verification includes changing the "functional_influence" properties to cover properties, such as "input_influence: cover property (@(posedge CLK1) disable iff(rst) $changed(IN2)|→$stable(n1))". Internal signal consistency verification also includes removing a consequent part of a cover property, such as "input_influence: cover property (@(posedge CLK1) disable iff(rst) $changed(IN2))". The signal names are also mapped to have hierarchical paths. The virtual clock and reset signals are mapped to the actual clocks and reset signals at the analysis level. Accordingly, the name of the assertion is changed to have the instance name of the module appended to it, such as "input_influence_IP2: cover property (@(posedge ck1.IP1) disable iff (RESET) $changed(IN2.IP2))". The cover property can be verified by formal verification, simulation, or other tools.

The data captured for verifying assumptions for formal runs includes functional properties internal to the IP cores and not influenced by external elements in the SoC or subsystem, such as a relation between internal signals in the IP core. For example, the text data for the verification of assumptions for formal runs includes: at IP2 level: functional_internal={{internal_function:assert property (@(posedge CLK1) disable iff(rst) $changed(n1)|→$stable(n2));}}.

The verification of assumptions for formal runs includes optimizing the run time of a formal tool, such as a program, based on the internal signal properties at the analysis level. In an example, the verification of assumptions for formal runs includes changing "functional_internal" properties to assume properties, such as "internal_function: assume property (@(posedge CLK1) disable iff(rst) $changed(n1)|→$stable(n2))". The signal names are also mapped to have hierarchical paths. The virtual clock and reset signals are mapped to the actual clocks and reset signals at the analysis level. Accordingly, the name of the assertion is changed to have the instance name of the module appended to it, such as "internal_function: assume property (@(posedge ck1.IP1) disable iff(RESET) $changed(n1.IP2)|→$stable(n2.IP2))". The assumptions are provided to optimize the runtime of formal tools, such as a program, for the verification process.

In examples, the foregoing methods for CDC and RDC verification may be implemented by using software, hardware, firmware, or any combination thereof. When software is used to implement the embodiments, the embodiments may be implemented completely or partially in a form of a computer program product including instructions. When the instructions are run on a computer, the computer is enabled to perform functions of the foregoing communications devices. The instructions may be stored on a computer-readable storage medium. The computer-readable storage medium is configured to store the foregoing instructions, so that a computer can run the instructions to implement steps of the forgoing methods.

The term "couple" appears throughout the specification. The term may cover connections, communications or signal paths that enable a functional relationship consistent with this description. For example, if device A provides a signal to control device B to perform an action, in a first example device A is coupled to device B or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device or a combination thereof.

An architecture or device that is described herein as including certain components may instead be adapted to be coupled to those components to form the described architecture or device.

Unless otherwise stated, "about," "approximately," or "substantially" preceding a value means+/−10 percent of the stated value. Modifications are possible in the described examples, and other examples are possible within the scope of the claims.

What is claimed is:

1. A method, comprising:
    obtaining, by a computer processor according to computer instructions, data models of intellectual property (IP) cores for hierarchical clock domain crossing (CDC) and reset domain crossing (RDC) verification, the IP cores comprising reusable units of logic for a system on a chip (SoC); and
    performing, by the computer processor based on the data models of the IP cores, the hierarchical CDC and RDC verification for the SoC according to integration of the IP cores in the SoC, the hierarchical CDC and RDC verification including consistency verification of functional assumptions with structural analysis of the IP cores individually and in a context of use of the IP cores in the SoC.

2. The method of claim 1, further comprising performing CDC and RDC analysis of the IP cores individually, wherein the data models for the hierarchical CDC and RDC verification of the IP cores are obtained according to the CDC and RDC analysis of the IP cores and according to the integration of the IP cores in the SoC.

3. The method of claim 1, further comprising obtaining a hierarchical analysis model including interconnectivity among the IP cores in the SoC, internal signaling within the IP cores, and functional assumptions of the IP cores individually and in the context of use in the SoC, the hierarchical analysis model including the data models of the IP cores according to the integration of the IP cores in the SoC.

4. The method of claim 1, further comprising:
    updating the data models of the IP cores responsive to failure of the hierarchical CDC and RDC verification for the SoC; and
    performing the hierarchical CDC and RDC verification again based on the updated data models.

5. The method of claim 1, wherein the consistency verification of functional assumptions with structural analysis of the IP cores is based on IP core level information including information on clock and reset sources internal to the IP cores and information on relationships of the reset sources to boundary signals in the IP cores.

6. The method of claim 1, wherein the consistency verification of functional assumptions with structural analysis of the IP cores is based on IP core level information including correlations of port synchronicity at a SoC level with synchronicity assumptions at an IP core level.

7. The method of claim 1, wherein the consistency verification of functional assumptions with structural analysis of the IP cores is based on IP core level information including IP core level boundary assumptions related to domain crossings between the IP cores at an SoC level and boundary connectivity based on the integration of the IP cores in the SoC.

8. The method of claim 1, wherein the functional assumptions of the IP cores include assumptions on ports including assumptions of signal constants, pseudo-static signals, and mutual-exclusivity of signals.

9. The method of claim 1, wherein the functional assumptions of the IP cores include functional coverage items for assumptions internal to the IP cores that are based on the integration of the IP cores in the SOC including assumptions internal to the IP cores that have dependency on ports sequences.

10. The method of claim 1, wherein the functional assumptions of the IP cores include functional assumptions internal to the IP cores independent of ports.

11. An apparatus comprising:
a memory configured to store instructions; and
a processor coupled to the memory, the instructions executable by the processor to cause the processor to be configured to:
obtain data models of intellectual property (IP) cores, the IP cores including reusable units of logic for a system on a chip (SoC), and the data models including information regarding interconnectivity and internal signaling of the IP cores and information regarding functional assumptions of the IP cores individually;
perform, based on the data models, clock domain crossing (CDC) and reset domain crossing (RDC) verification of the functional assumptions of the IP cores in a context of use of the IP cores in the SoC; and
perform CDC and RDC verification with structural analysis of the IP cores based on integration of the IP cores in the SoC including the interconnectivity and internal signaling of the IP cores.

12. The apparatus of claim 11, wherein the instructions further cause the processor to be configured to:
obtain information for a consistency check of the structural analysis from the data models;
generate an SoC context for the IP core boundaries based on analysis of connectivity of the SoC and the IP cores; and
perform the consistency check to verify consistency between IP core level information obtained from the data models and the generated SoC context.

13. The apparatus of claim 12, wherein the information for the consistency check of the structural analysis includes port information, port constraints, and information of clock and reset signal relations, synchronization, and convergence at the IP cores.

14. The apparatus of claim 11, wherein the instructions further cause the processor to be configured to:
obtain boundary assumptions internal to the IP cores and boundary signal dependencies from the data models for the IP cores;
verify, at an SoC level, the boundary assumptions internal to the IP cores; and
verify the boundary signal dependencies according to functional coverage items for assumptions internal to IP cores.

15. The apparatus of claim 14, wherein the instructions further cause the processor to be configured to remove selective block-boxing of the IP cores based on the assumptions dependencies.

16. An apparatus comprising:
a memory configured to store instructions; and
a processor coupled to the memory, the instructions executable by the processor to cause the processor to be configured to:
obtain data models of intellectual property (IP) cores, the IP cores including reusable units of logic for a system on a chip (SoC);
obtain, according to the data models, a hierarchical analysis model including interconnectivity and internal signaling of the IP cores and functional assumptions of the IP cores both individually and in a context of use of the IP cores in the SoC; and
perform, based on the hierarchical analysis model, hierarchical clock domain crossing (CDC) and reset domain crossing (RDC) verification for the SoC according to an integration of the IP cores in the SoC, the hierarchical CDC and RDC verification including consistency verification of functional assumptions of the IP cores and structural analysis of the IP cores both individually and in the context of use of the IP cores in the SoC.

17. The apparatus of claim 16, wherein the data models and the hierarchical analysis model include IP core level information for performing the hierarchical CDC and RDC verification with structural analysis, the IP core level information including properties of ports and related port constraints.

18. The apparatus of claim 17, wherein the properties of the ports and related port constraints include clock signal and reset signal associations, clock signal relations, reset signal orders, internal clock and reset sources, glue logic presence on the ports, convergence logic and depth of convergence logic on the ports, and synchronization and hand-shake port properties.

19. The apparatus of claim 16, wherein the functional assumptions include assumptions on signal functional properties including properties associated with integration of ports at an SoC level, first properties internal to the IP cores, and second properties both internal to the IP cores and having triggers at the SoC level.

20. The apparatus of claim 16, wherein the functional assumptions include assumptions on ports, functional coverage items for assumptions internal to the IP cores that are influenced by the SoC, and internal functional assumptions at an IP core level.

* * * * *